(12) United States Patent
Dodge et al.

(10) Patent No.: US 7,987,190 B2
(45) Date of Patent: *Jul. 26, 2011

(54) FILESYSTEM HAVING A FILENAME CACHE

(75) Inventors: Dan Dodge, Nepean-Ontario (CA);
Peter ver der Veen, Ottawa-Ontario (CA)

(73) Assignee: QNX Software Systems GmbH & CO. KG, Hannover (DE)

( * ) Notice: Subject to any disclaimer, the term of this patent is extended or adjusted under 35 U.S.C. 154(b) by 0 days.

This patent is subject to a terminal disclaimer.

(21) Appl. No.: 12/960,197

(22) Filed: Dec. 3, 2010

(65) Prior Publication Data

US 2011/0078219 A1    Mar. 31, 2011

Related U.S. Application Data

(63) Continuation of application No. 11/717,583, filed on Mar. 13, 2007, now Pat. No. 7,908,276.

(60) Provisional application No. 60/841,804, filed on Sep. 1, 2006, provisional application No. 60/840,246, filed on Aug. 25, 2006.

(51) Int. Cl.
*G06F 17/30* (2006.01)

(52) U.S. Cl. ............................. 707/741; 711/2

(58) Field of Classification Search .......... None
See application file for complete search history.

(56) References Cited

U.S. PATENT DOCUMENTS

| 4,882,703 A | 11/1989 | Nicolai ............ 364/900 |
|---|---|---|
| 4,926,317 A | 5/1990 | Wallach et al. ............ 364/200 |
| 4,945,475 A | 7/1990 | Bruffey et al. ............ 364/200 |
| 5,187,786 A | 2/1993 | Densmore et al. ............ 395/600 |
| 5,201,044 A | 4/1993 | Frey, Jr. et al. ............ 395/575 |
| 5,222,217 A | 6/1993 | Blount et al. ............ 395/325 |
| 5,369,757 A | 11/1994 | Spiro et al. ............ 395/575 |
| 5,375,233 A | 12/1994 | Kimber et al. ............ 395/600 |
| 5,454,103 A | 9/1995 | Coverston et al. ............ 395/600 |
| 5,455,944 A | 10/1995 | Haderle et al. ............ 395/600 |
| 5,530,849 A | 6/1996 | Hanushevsky et al. ............ 395/600 |

(Continued)

FOREIGN PATENT DOCUMENTS

CN    1289966 A    4/2001

(Continued)

OTHER PUBLICATIONS

"Hash Addressing Viability for Use in Distributed File Systems," by Shuff and Dyaberi. IN: Proceedings of the Winter Int'l Symposium on Information and Communication Technologies (2004). Available at: http://citeseerx.ist.psu.edu/viewdoc/download?doi=10.1.1.90.1177&rep=rep1&type=pdf Last visited: Mar. 4, 2011.*

(Continued)

*Primary Examiner* — Neveen Abel-Jalil
*Assistant Examiner* — Daniel Kinsaul
(74) *Attorney, Agent, or Firm* — Brinks Hofer Gilson & Lione

(57) ABSTRACT

A system comprising a processor, a data storage device that is accessible by the processor, and filesystem software that is executable by the processor to organize files on the data storage device are provided. The filesystem software is executable to maintain a filename cache having variable size filename entries. The filename entries may include a filename header section and a name section storing an entire filename of a corresponding file.

20 Claims, 5 Drawing Sheets

U.S. PATENT DOCUMENTS

| | | | |
|---|---|---|---|
| 5,726,989 A | 3/1998 | Dokic | 370/509 |
| 5,765,172 A | 6/1998 | Fox | 707/204 |
| 5,774,715 A | 6/1998 | Madany et al. | 395/612 |
| 5,806,085 A | 9/1998 | Berliner | 711/113 |
| 5,897,661 A | 4/1999 | Baranovsky et al. | 711/170 |
| 5,923,900 A * | 7/1999 | Soell et al. | 710/40 |
| 5,960,436 A | 9/1999 | Chang et al. | 707/101 |
| 5,983,293 A | 11/1999 | Murakami | 710/56 |
| 5,995,980 A | 11/1999 | Olson et al. | 707/201 |
| 6,058,400 A | 5/2000 | Slaughter | 707/201 |
| 6,173,291 B1 | 1/2001 | Jenevein | 707/200 |
| 6,175,900 B1 | 1/2001 | Forin et al. | 711/156 |
| 6,185,663 B1 | 2/2001 | Burke | 711/156 |
| 6,286,013 B1 | 9/2001 | Reynolds et al. | 707/200 |
| 6,292,808 B1 | 9/2001 | Obermarck et al. | 707/202 |
| 6,324,637 B1 | 11/2001 | Hamilton | 711/216 |
| 6,356,863 B1 | 3/2002 | Sayle | 703/27 |
| 6,377,992 B1 | 4/2002 | Plaza Fernández et al. | 709/227 |
| 6,389,427 B1 | 5/2002 | Faulkner | 707/104.1 |
| 6,389,513 B1 | 5/2002 | Closson | 711/129 |
| 6,396,421 B1 | 5/2002 | Bland | 341/61 |
| 6,412,042 B1 | 6/2002 | Paterson et al. | 711/112 |
| 6,438,661 B1 | 8/2002 | Beardsley et al. | 711/144 |
| 6,467,021 B1 | 10/2002 | Sinclair | 711/113 |
| 6,496,944 B1 | 12/2002 | Hsiao et al. | 714/15 |
| 6,509,850 B1 | 1/2003 | Bland | 341/61 |
| 6,571,259 B1 | 5/2003 | Zheng et al. | 707/205 |
| 6,584,582 B1 | 6/2003 | O'Connor | 714/21 |
| 6,591,376 B1 | 7/2003 | VanRooven et al. | 714/36 |
| 6,606,628 B1 | 8/2003 | Monsen et al. | 707/100 |
| 6,661,357 B2 | 12/2003 | Bland | 341/61 |
| 6,675,177 B1 | 1/2004 | Webb | 707/200 |
| 6,732,124 B1 | 5/2004 | Koseki et al. | 707/202 |
| 6,748,491 B2 | 6/2004 | Rodriguez | 711/122 |
| 6,754,696 B1 | 6/2004 | Kamath et al. | 709/213 |
| 6,845,401 B1 | 1/2005 | Papadopoulos et al. | 709/250 |
| 6,856,993 B1 | 2/2005 | Verma et al. | 707/101 |
| 6,922,708 B1 | 7/2005 | Sedlar | 707/202 |
| 7,003,619 B1 | 2/2006 | Moore et al. | 711/102 |
| 7,047,257 B2 | 5/2006 | Fletcher et al. | 707/201 |
| 7,076,599 B2 | 7/2006 | Aasheim et al. | 711/103 |
| 7,096,248 B2 | 8/2006 | Masters et al. | 709/201 |
| 7,139,752 B2 | 11/2006 | Broder et al. | 707/4 |
| 7,181,463 B2 | 2/2007 | Moore et al. | 707/102 |
| 7,191,170 B2 * | 3/2007 | Ganguly et al. | 707/741 |
| 7,191,185 B2 | 3/2007 | Dweck et al. | 707/102 |
| 7,349,927 B2 | 3/2008 | Kanai et al. | 707/200 |
| 7,359,934 B1 | 4/2008 | Ricart et al. | 709/203 |
| 7,383,286 B2 | 6/2008 | Hamanaka et al. | 707/200 |
| 7,529,784 B2 | 5/2009 | Kavuri et al. | 707/204 |
| 7,555,483 B2 | 6/2009 | Maeda et al. | 707/10 |
| 7,565,452 B2 | 7/2009 | Freiburg et al. | 709/246 |
| 7,870,138 B2 * | 1/2011 | Van Voorhis | 707/741 |
| 2001/0044798 A1 | 11/2001 | Nagral et al. | 707/102 |
| 2002/0048223 A1 | 4/2002 | Ota et al. | 369/1 |
| 2002/0120634 A1 | 8/2002 | Min et al. | 707/200 |
| 2002/0143862 A1 | 10/2002 | Peterson | 709/203 |
| 2002/0156840 A1 | 10/2002 | Ulrich et al. | 709/203 |
| 2002/0156937 A1 | 10/2002 | Wong et al. | 709/328 |
| 2002/0156938 A1 | 10/2002 | Wong et al. | 709/328 |
| 2002/0156975 A1 * | 10/2002 | Staub et al. | 711/114 |
| 2002/0165942 A1 | 11/2002 | Ulrich et al. | 709/219 |
| 2002/0174295 A1 | 11/2002 | Ulrich et al. | 711/114 |
| 2003/0061316 A1 | 3/2003 | Blair et al. | 709/220 |
| 2003/0065682 A1 | 4/2003 | Nakajima | 707/200 |
| 2003/0070001 A1 | 4/2003 | Belknap et al. | 709/321 |
| 2003/0110237 A1 | 6/2003 | Kitamura et al. | 709/219 |
| 2003/0115227 A1 | 6/2003 | Guthery | 707/205 |
| 2003/0140210 A1 | 7/2003 | Testardi | 711/203 |
| 2003/0163594 A1 | 8/2003 | Aasheim et al. | 709/310 |
| 2003/0225585 A1 | 12/2003 | Miller et al. | 705/1 |
| 2004/0064500 A1 | 4/2004 | Kolar et al. | 709/202 |
| 2004/0114589 A1 | 6/2004 | Alfieri et al. | 370/389 |
| 2004/0215600 A1 | 10/2004 | Aridor et al. | 707/3 |
| 2004/0236793 A1 | 11/2004 | Kanai et al. | 707/104.1 |
| 2005/0050073 A1 | 3/2005 | Demiroski et al. | 707/100 |
| 2005/0091229 A1 | 4/2005 | Bali et al. | 707/100 |
| 2005/0091287 A1 | 4/2005 | Sedlar | 707/200 |
| 2005/0117885 A1 | 6/2005 | Lee et al. | 386/95 |
| 2005/0135341 A1 | 6/2005 | Kim | 370/352 |
| 2005/0144526 A1 | 6/2005 | Banko | 714/38 |
| 2005/0147130 A1 | 7/2005 | Hurwitz et al. | 370/503 |
| 2005/0149525 A1 | 7/2005 | Verma et al. | 707/8 |
| 2005/0210507 A1 | 9/2005 | Hawkins et al. | 725/46 |
| 2005/0240588 A1 | 10/2005 | Siegel et al. | 707/9 |
| 2005/0246362 A1 | 11/2005 | Borland | 707/101 |
| 2005/0251540 A1 | 11/2005 | Sim-Tang | 707/202 |
| 2005/0256845 A1 | 11/2005 | Jen et al. | 707/3 |
| 2005/0273486 A1 | 12/2005 | Keith Jr. | 709/200 |
| 2006/0015431 A1 | 1/2006 | Bugaj et al. | 705/35 |
| 2006/0021057 A1 | 1/2006 | Risan et al. | 726/26 |
| 2006/0074851 A1 | 4/2006 | Nagai et al. | 707/1 |
| 2006/0117056 A1 | 6/2006 | Havewala et al. | 707/102 |
| 2006/0136529 A1 | 6/2006 | Pudipeddi et al. | 707/205 |
| 2006/0188215 A1 | 8/2006 | Matsutani | 386/46 |
| 2006/0190469 A1 | 8/2006 | Kathuria et al. | 707/101 |
| 2006/0195480 A1 | 8/2006 | Spiegelman et al. | 707/104.1 |
| 2006/0206538 A1 | 9/2006 | Veazey | 707/202 |
| 2006/0218195 A1 | 9/2006 | LaChapelle et al. | 707/104.1 |
| 2006/0224620 A1 | 10/2006 | Silverman et al. | 707/104.1 |
| 2006/0242179 A1 | 10/2006 | Chen et al. | 707/100 |
| 2006/0253502 A1 | 11/2006 | Raman et al. | 707/202 |
| 2006/0277183 A1 | 12/2006 | Nichols et al. | 707/9 |
| 2007/0005560 A1 | 1/2007 | Dodge | 707/1 |
| 2007/0005614 A1 | 1/2007 | Dodge | 707/100 |
| 2007/0005615 A1 | 1/2007 | Dodge | 707/100 |
| 2007/0005627 A1 | 1/2007 | Dodge | 707/101 |
| 2007/0005874 A1 | 1/2007 | Dodge | 711/103 |
| 2007/0005894 A1 | 1/2007 | Dodge | 711/118 |
| 2007/0073937 A1 | 3/2007 | Feinberg et al. | 710/62 |
| 2007/0103984 A1 | 5/2007 | Kavuri et al. | 365/185.17 |
| 2007/0113120 A1 | 5/2007 | Dodge | 714/703 |
| 2007/0185879 A1 | 8/2007 | Roublev et al. | 707/10 |
| 2007/0198746 A1 | 8/2007 | Myllyla et al. | 709/248 |
| 2008/0033777 A1 | 2/2008 | Shukoor | 705/8 |
| 2008/0046667 A1 | 2/2008 | Fachan et al. | 711/154 |
| 2008/0052323 A1 | 2/2008 | Dodge et al. | 707/201 |
| 2008/0052329 A1 | 2/2008 | Dodge et al. | 707/205 |
| 2008/0059510 A1 | 3/2008 | Cardamore et al. | 707/102 |
| 2008/0126936 A1 | 5/2008 | Williams | 715/717 |
| 2008/0147747 A1 | 6/2008 | Cardamore | 707/200 |
| 2008/0228843 A1 | 9/2008 | Dodge et al. | 707/205 |
| 2009/0037651 A1 | 2/2009 | Gorobets | 711/103 |
| 2009/0265793 A1 | 10/2009 | Risan et al. | 726/29 |

FOREIGN PATENT DOCUMENTS

| | | |
|---|---|---|
| CN | 1567256 A | 1/2005 |
| CN | 1705935 A | 12/2005 |
| EP | 0 410 210 A2 | 1/1991 |
| EP | 0 454 340 A2 | 10/1991 |
| EP | 0 588 488 A1 | 3/1994 |
| EP | 1 089 176 A2 | 4/2001 |
| EP | 1 522 927 A2 | 4/2005 |
| JP | 2006-235717 | 8/1987 |
| JP | 06 139 124 A | 5/1994 |
| JP | 62 186 361 A | 3/1995 |
| JP | 07-078498 | 6/2001 |
| JP | 2001-175624 | 6/2001 |
| JP | 2001-175681 | 11/2002 |
| JP | 2002-334006 | 6/2003 |
| JP | 2003-173279 | 7/2003 |
| JP | 2003-216620 | 7/2005 |
| JP | 2005-182778 | 9/2006 |
| KR | 2006/0009717 | 2/2006 |
| KR | 10/2006/0023387 | 3/2006 |
| WO | WO 00/14632 A | 3/2000 |
| WO | WO 02/17140 A | 2/2002 |
| WO | WO 2006/061454 | 6/2006 |

OTHER PUBLICATIONS

"Fast Hashing of Variable-length Text Strings," by Pearson, Peter. In: Communications of the ACM, vol. 33, Issue 6 (1990). Available at: ACM.*

U.S. Appl. No. 12/957,999, filed Dec. 1, 2010, Dodge.

U.S. Appl. No. 12/960,197, filed Dec. 3, 2010, Dodge et al.

Cardenas, Alfonso F., "Analysis and Performance of Inverted Data Base Structures," IBM Research Laboratory, San Jose, Communication of ACM May 1975, vol. 18, No. 5, pp. 253-263.

Colyer, A. M., "Displaying and Manipulating Relationships," IBM Technical Disclosure Bulletin, Dec. 1995, vol. 38, Issue No. 12, pp. 391-396.

QNX Software Systems, "Embedded transaction filesystem (ETFS)," System Architecture, 2004, pp. 193-198.

Yim et al, "A Flash Compression Layer for SmartMedia Card Systems," IEEE Transactions on Consumer Electronics, vol. 50, No. 1., 2004, pp. 192-197.

Woodhouse, D., "JFFS: The Journalling Flash File System," Red Hat, Inc., 2005, 12 pages.

Sivathanu, Gopalan, Wright, Charles P., Zadok, Erez, Enhancing File System Integrity Through Checksums, dated Apr. 3, 2009, pp. 1-10, available at www.filesystems.org.

Muniswamy-Reddy, Kiran-Kumar, A Versatile and User-Oriented Versioning File System, Dec. 2003, pp. 1-40, Stony Brook University.

Tambat, Siddhartha V. et al., Sub-tagged Caches: Study of Variable Cache-Block Size Emulation, Jul. 31, 2001, pp. 1-16, Computer Science and Automation Department Indian Institute of Science, India.

Examination Report, dated Feb. 21, 2011, pp. 1-7, European Patent Application No. 07015731.8, European Patent Office, The Netherlands.

Order Granting Request for Ex Parte Reexamination, dated Feb. 4, 2011, pp. 1-12, U.S. Appl. No. 90/011,299, U.S. Patent and Trademark Office, Virginia.

Shuff, Pat et al., Hash Addressing Viability for Use in Distributed File Systems, 2004, pp. 1-7, Proceedings of the Winter Int'l Symposium on Information and Communication Technologies.

Pearson, Peter K., Fast Hashing of Variable-Length Text Strings, Jun. 1990, pp. 677-680, vol. 33, No. 6, Communications of the ACM.

\* cited by examiner

FILESYSTEM HAVING A FILENAME CACHE

PRIORITY CLAIM

This application is a continuation application of, and claims priority under 35 U.S.C. §120 to, U.S. patent application Ser. No. 11/717,583, "FILESYSTEM HAVING A FILENAME CACHE," filed Mar. 13, 2007, the entire contents of which are incorporated by reference, which claims priority to both U.S. Provisional Application No. 60/841,804, filed Sep. 1, 2006, and U.S. Provisional Application No. 60/840,246, filed Aug. 25, 2006, the entire contents of which are incorporated by reference.

BACKGROUND OF THE INVENTION

1. Technical Field

This invention is generally directed to a filesystem for use in a computer, embedded controller, processing system, or the like. More particularly, this invention is directed to a filesystem having a filename cache.

2. Related Art

Computers, embedded controllers, and other microprocessor based systems are typically constructed from a variety of different hardware components. The hardware components may include a processor, I/O devices, human interface devices, and the like. Additionally, such systems use memory storage units to maintain the data used in the system. The memory storage units may take on a variety of different forms including, but not limited to, hard disk drives, floppy disk drives, random access memory, flash memory, and the like.

High-level application programs that are executed in such systems must often interact seamlessly with these hardware components, including the memory storage units. To this end, many systems run an operating system that acts as an interface between the application programs and the system hardware. Filesystem software may be included as part of the operating system or it may be provided as an ancillary software component that interacts with the operating system. In either instance, the filesystem software organizes the data within the memory storage units for ready access by the processor and the high-level application programs that the processor executes.

The filesystem software may employ a file/directory layer that organizes the contents of files and directories into equal-sized logical blocks of contiguous data. Each logical block has an association with one or more corresponding physical blocks on the storage device where the data is actually retained. The file/directory layer executes updates to the filesystem by identifying every block that needs to be updated in response to a request and rewriting the entire contents of each such block. The file/directory layer reads the contents of files and directories by reading the entire contents of every block that holds a portion of the region of data to be read.

The filesystem also may include a storage layer that maps the virtual addresses of filesystem contents to physical blocks of data on the data storage device. The storage layer may execute logical block read requests from the file/directory layer by determining the correct physical block(s) associated with the request and reading its contents from the data storage device. Similarly, the storage layer may execute right requests by either updating contents of an existing physical block(s), or by allocating an unused physical block from the data storage device to the logical block and then updating the contents of the physical block.

The filesystem also may be responsible for locating a file in data storage using, for example, a filename associated with the file. Systems such as UNIX employ a filename cache in which a fixed number of bytes are allocated to each filename for this purpose. This system may be wasteful of memory space when the filenames are short and may result in ambiguous hits for long filenames that have been truncated to fit into the fixed byte allocation. Accordingly, there is a need for an improved filename caching system.

SUMMARY

A system that comprises a processor, a data storage device that is accessible by the processor, and filesystem software that is executable by the processor to organize files on the data storage device are provided. The filesystem software may be executable to maintain a filename cache having variable size filename entries. The filename entries may include a filename header section and a name section storing an entire filename of a corresponding file. In one example, the filename cash is implemented in a ring-type buffer or the like.

The filename header section may include a variety of information. For example, the filename header section may include information corresponding to a length of the filename in the name section, information uniquely identifying the file associated with the filename in the name section, information for indexing into a filename hash table, information indicative of whether the filename entry corresponds to a first entry in the filename hash table for a particular namesum, and/or information indicative of whether the filename in the respective name section is not locatable on the system. Still further, the filename header section may include an index to the next name in the filename cache buffer having the same namesum value to thereby facilitate searches through the filename cache.

Other systems, methods, features and advantages of the invention will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION OF THE PREFERRED EMBODIMENTS

Figure 1:
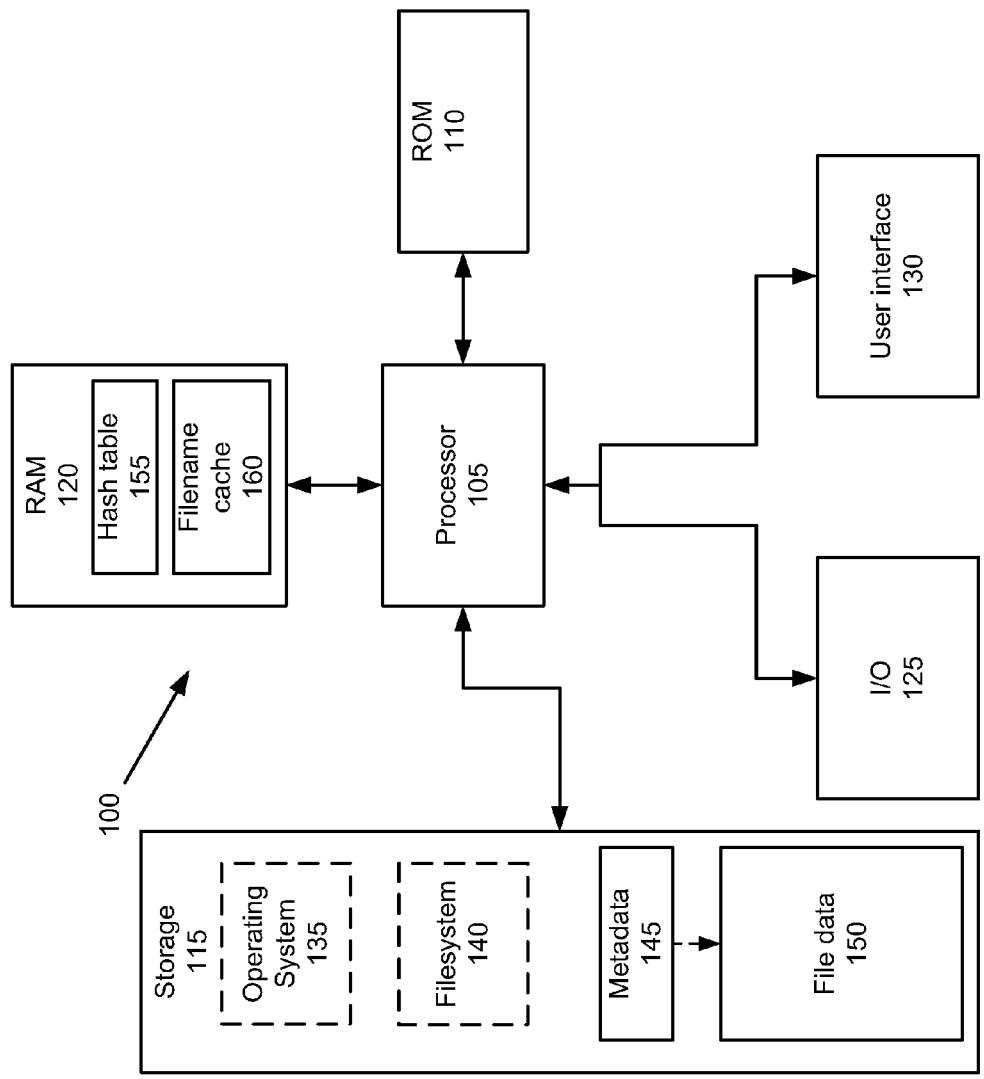
FIG. 1 is a block diagram of a processing system that may implement a filesystem having a filename cache.

FIG. 1 illustrates the components that may be employed in an exemplary processing system 100. As shown, the exemplary system 100 includes a processor 105, read only memory 110, and data storage 115. Processing system 100 also may include random access memory 120, an I/O interface 125, and a user interface 130. The specific components that are used in processing system 100 may be tailored to the particular function(s) that are to be executed by the processing system 100. Accordingly, the presence or absence of a component may be specific to the design criterion imposed on the processing system 100.

Data storage 115 may include operating system code 135 that controls the interaction between high-level application programs executed by the processor 105 and the various hardware components, including memory 110 and 120, the data storage 115, and the interface devices 125 and 130. The operating system code 135 may include filesystem software for organizing files stored on the data storage 115. Alternatively, the filesystem software may be provided as a separate software component that merely interacts with the operating system code 135. In the latter case, the code corresponding to the filesystem software may be stored in read only memory 110, data storage 115 or the like. When processing system 100 is networked with other computers and/or storage devices through I/O interface 125, the filesystem software may be stored remotely and downloaded to the processing system 100 as needed. FIG. 1, however, illustrates storage of the filesystem software 140 in data storage 115.

The data storage 115 may take on any number of different forms. For example, the data storage 115 may take the form of a hard disk drive, floppy disk drive, etc. It also may be in the form of a non-rotating media device, such as non-volatile memory implemented in an integrated circuit format (e.g., flash memory, and the like). Still further, data storage 115 need not be limited to a single memory structure. Rather, the data storage 115 may include a number of separate storage devices of the same type (e.g., all flash memory) and/or separate storage devices of different types (e.g., one or more flash memory units and one or more hard disk drives).

The files stored in the data storage 115 include data that is interpreted in accordance with a predetermined format used by an application program or by the operating system code 135. For example, the data stored within a file may constitute the software code of an executable program, the ASCII text of a database record, audio media files, video media files, or the like.

Storage 115 also includes a metadata file 145 that stores metadata information for the files organized in the file data area 150. In other system designs, metadata file 145 may be stored in RAM 120. Access to the metadata information for a file through use of a filename is streamlined using a hash table 155 and filename cache 160. In the exemplary system shown in FIG. 1, both the hash table 155 and the filename cache 160 are stored in RAM 120.

Figure 2:
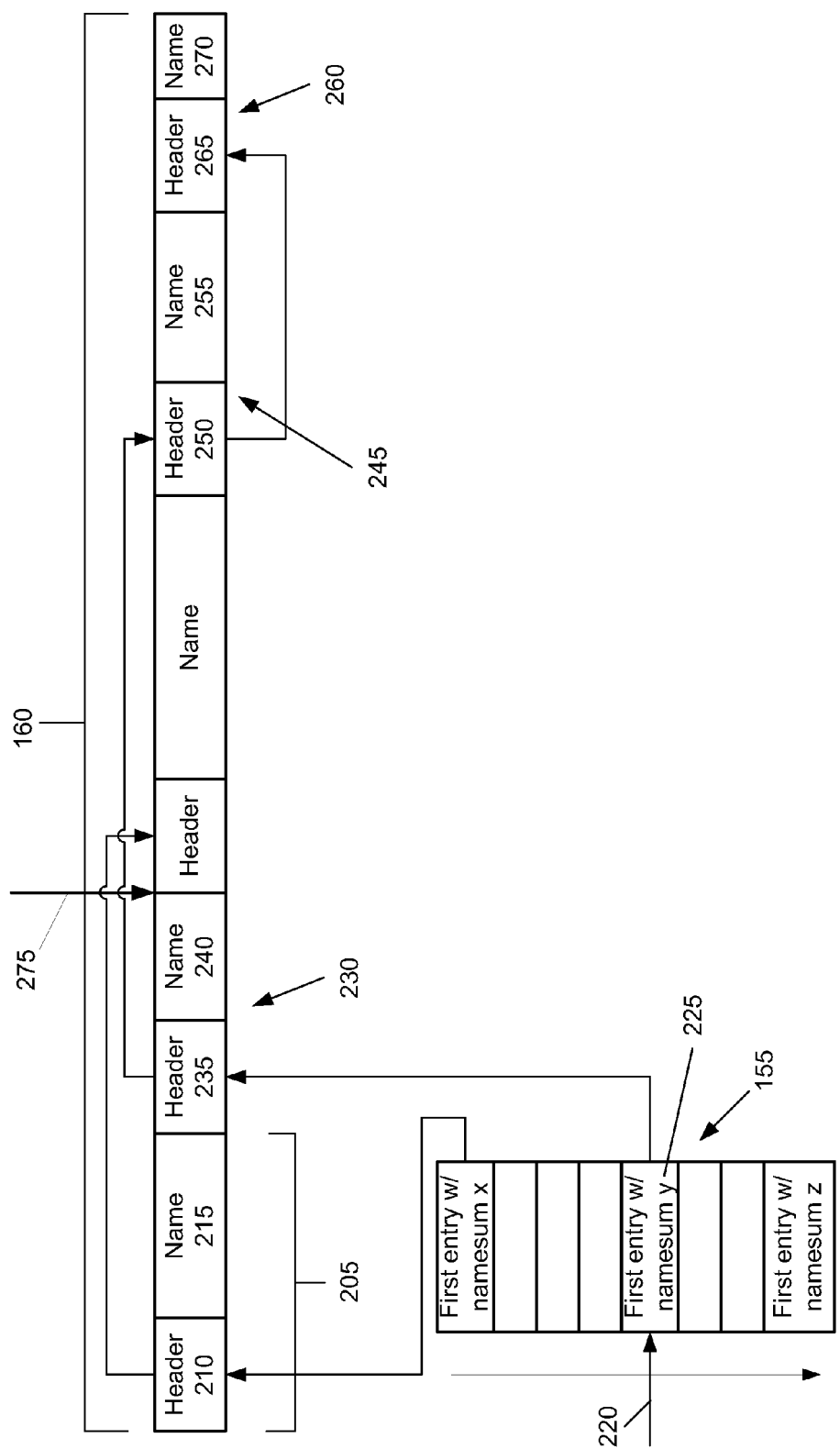
FIG. 2 illustrates one manner in which the filesystem software may implement a filename cache.

FIG. 2 illustrates one manner in which the filesystem software 140 may implement filename cache 160 and hash table 155. In this example, filename cache 160 may be in the form of a fixed sized buffer having filename entries 205 of varying size. Each filename entry 205 is comprised of a filename header section 210 and a name section 215. Except in the case of dummy filename entries, the name section 215 of each filename entry 205 includes the entire filename for a respective file and is variable in size while the filename header section 210 may have a fixed size.

Figure 3:
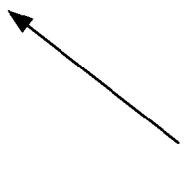
FIG. 3 illustrates one manner of arranging information in the filename header section of each filename entry shown in FIG. 2.

FIG. 3 illustrates one manner of arranging information in the filename header section 210. As shown, the filename header 210 includes a "next cache location" field 305, a unique file identifier field 310, a sequence number field 315, a name length field 320, a back index field 325, a missing field 330, an alias field 335, and an IsBack field 340. The "next cache location" field 305 serves as an index/pointer to the next filename entry in the cache 160 that has a filename with the same namesum value. This field is used to search the filename cache for a particular filename while avoiding unnecessary checks of intermediate filename entries that do not have the same namesum value. The unique file identifier field 310 is used to uniquely identify a given file in the filesystem. Here, the unique file identifier field 310 corresponds to the file having the filename in the name section 215 of the filename entry 205 and may be used to differentiate between different files having the same filename but which are stored in different storage locations. The sequence field 315 includes a sequence number that is unique to the filesystem. The name length field 320 of header section 210 provides information on the length of the name section 215, such as the number of bytes contained in the name section. The back field 325 provides an index into the hash table for the particular filename entry 205. The missing field 330 is used to identify whether the filename in name section 215 is located on the system. This allows the filesystem software 140 to quickly identify filenames that already have been searched and not located on the system thereby allowing the filesystem software to forgo unnecessary searching for the missing filename. The alias field 335 is used to identify the contents of the name section 215 as an alias name for the file. The IsBack field 340 is used to indicate whether the filename entry 205 corresponds to the first entry in hash table 155 for a particular namesum.

Figure 4:
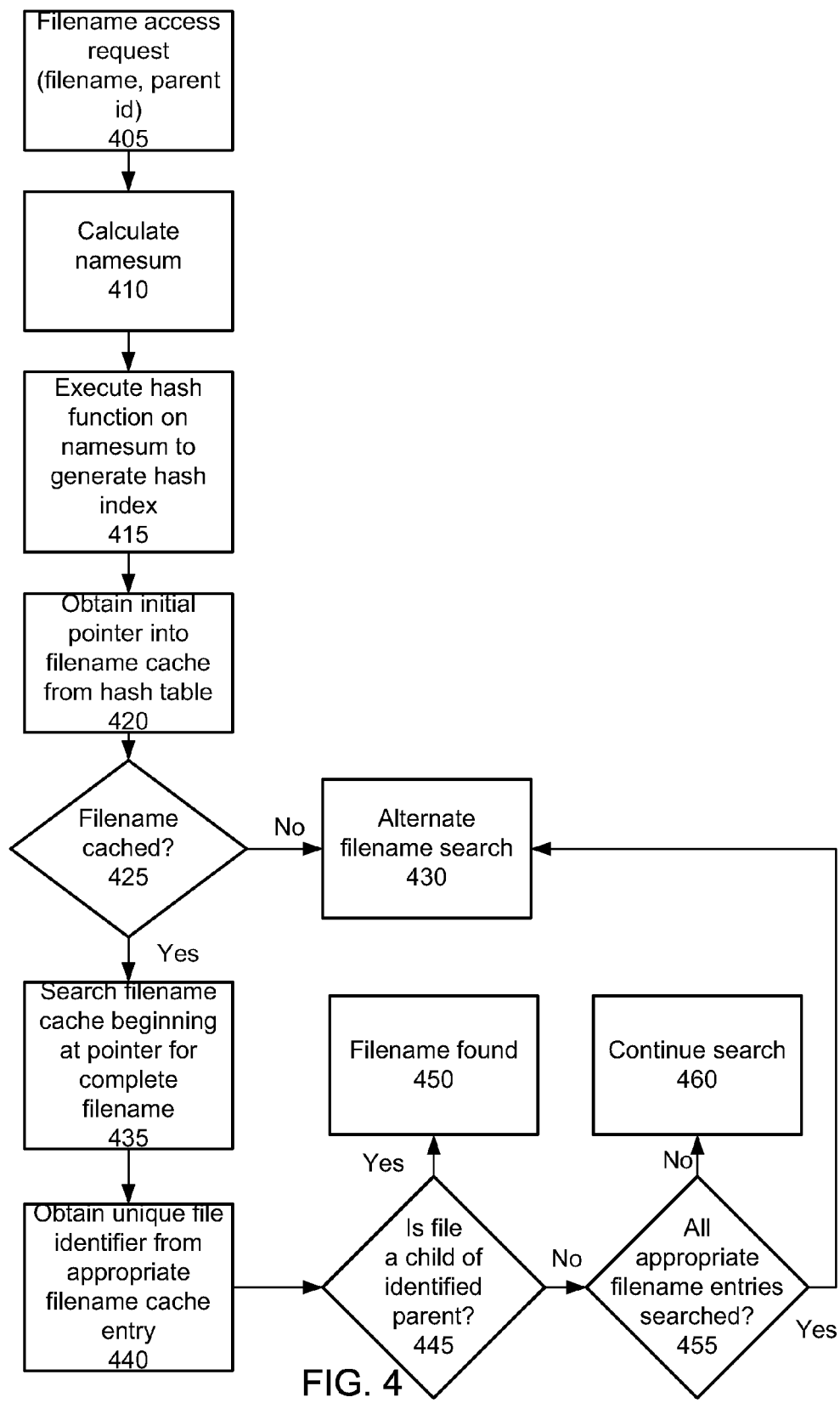
FIG. 4 is a flow chart showing a number of interrelated operations that may be used by the filesystem software to respond to a filename access request.

FIG. 4 is a flow chart showing a number of interrelated operations that may be used by the filesystem software 140 to respond to a filename access request. In this example, a filename access request is made at block 405. The request may include the filename and an identification of the parent directory/directories. The filesystem software 140 proceeds to calculate a namesum using the requested filename at block 410. A hash function is executed on the calculated namesum at block 415 to generate an index into hash table 155. The hash index is used at block 420 to obtain an initial pointer into the filename cache 160. If the initial pointer is invalid, then the filesystem software 140 assumes that the filename has not been cached at block 425 and an alternate filename search outside of the filename cache 160 is executed at block 430. Otherwise, the filesystem software 140 assumes that the filename is in the filename cache 160 and begins searching the filename entries 205 at block 435.

One manner of searching through the filename entries 205 is represented in FIG. 2. To this end, the index into hash table 155 obtained at block 415 of FIG. 4 is shown at arrow 220 and points to a hash table location 225 corresponding to a namesum=y (assuming that the namesum calculated at block 410 of FIG. 4 is also y.) The data in hash table location 225 serves as an initial pointer that directs the filesystem software 140 to the first entry in the filename cache 160 that has a name section 215 having the same namesum (y) as the filename requested at block 405. Here, the first entry is designated at 230 and includes filename header section 235 and name section 240. The filesystem software 140 compares the complete filename received at block 405 of FIG. 4 to the complete filename stored in name section 240 to determine whether there is a match. If there is no match, the filesystem software 140 checks the next field 305 of filename header section 235 to identify the next entry in the filename cache 160 storing a filename having a namesum=y. In FIG. 2, the next filename entry with namesum=y is filename entry 245 having filename header section 250 and name section 255. Again, the complete filename stored in name section 240 is compared to the complete name received at block 405 to determine whether there is a match. Assuming that there is a match, the unique file identifier 310 of filename header section 250 is obtained at block 440 of FIG. 4 and used at block 445 to determine whether the file referenced by the unique file identifier is a child of the parent directory provided during the filename access request of block 405. If it is, the filename has been found as indicated at block 450. If it is not, the filesystem software checks at block 455 to determine whether all appropriate filename entries having a namesum=y have been searched. If less than all appropriate filename entries have been searched, the search continues at block 460, where the next field 305 of the current filename entry is used to identify the next filename entry that is to be compared. In FIG. 2, the next field 305 of filename header section 250 points to filename entry 260 having filename header section 265 and name section 270. If all appropriate filename entries have been searched as determined at block 455, the alternate filename search of block 430 may be executed.

Figure 5:
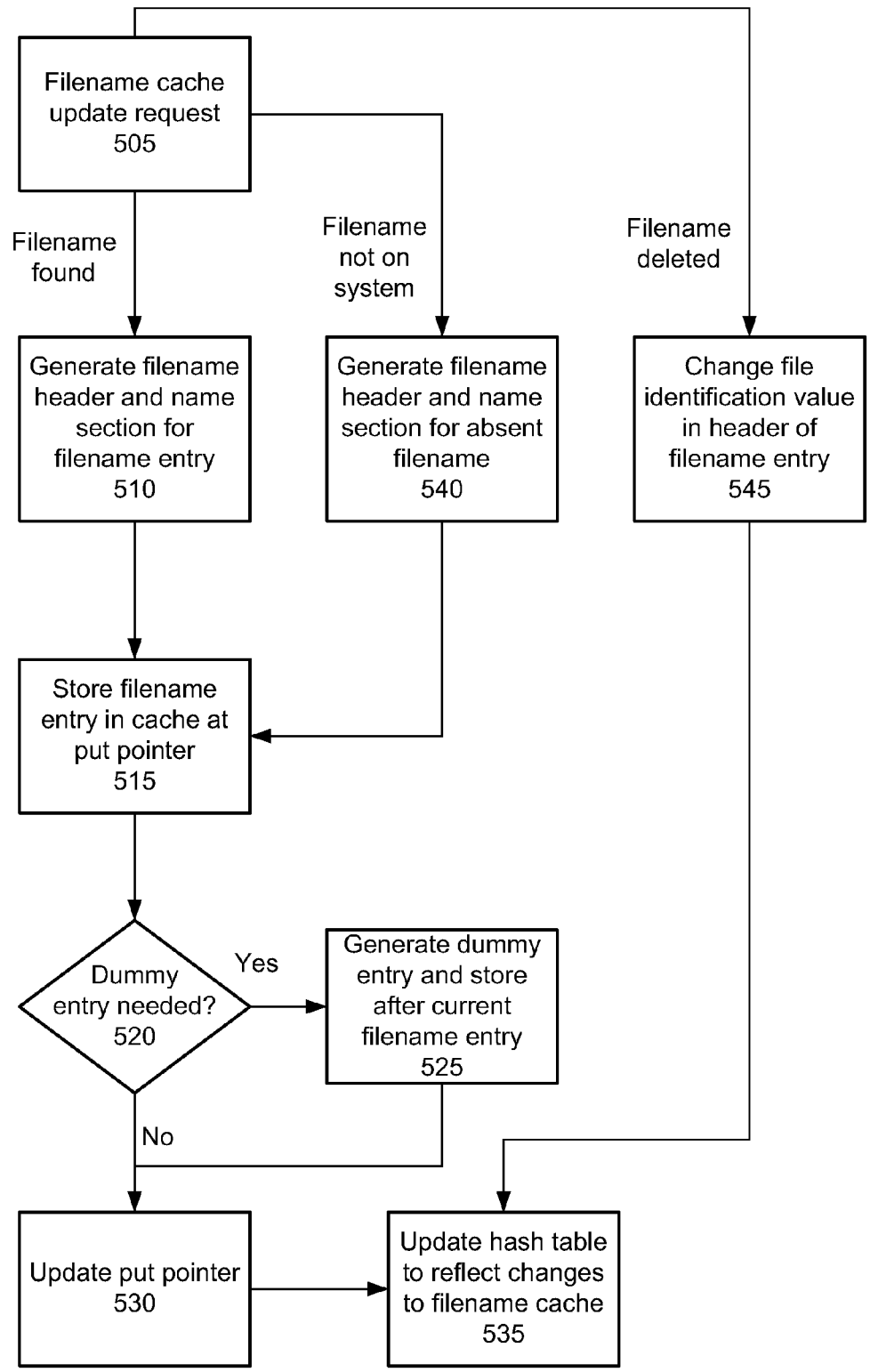
FIG. 5 is a flow chart showing a number of interrelated operations that may be executed by the filesystem software in responding to a filename cache update request.

FIG. 5 is a flow chart showing a number of interrelated operations that may be executed by the filesystem software 140 in responding to a filename cache update request. As shown, a filename cache update request is received at block 505 and, in the illustrated example, may correspond to one of three different request types: filename found update, filename not on system update, and filename deleted update. In a "filename found update," the filesystem software 140 is directed to store a filename entry for a corresponding filename in the filename cache 160. To this end, the information provided to the filesystem software 140 in the request is used to generate a filename header section and name section for the filename entry at block 510. Since the filename cache 160 is in the form of a fixed buffer, it employs a put pointer 275 (see FIG. 2) that rotates through the cache buffer to indicate where the next filename entry is to be stored. Once the put pointer extends beyond the end of the filename cache 160, it is rotated back to a beginning portion of the filename cache 160. As such, filename entries are added to the filename cache 160 in a ring-like manner where newer filename entries in the cache are written over older filename entries.

The filename header section and name section for the filename entry generated at block 510 are stored as a filename entry at the put pointer location in the operation shown at block 515. This operation may overwrite one or more existing filename entries of the filename cache 160 thereby leaving unused space between the end of the new filename entry and the beginning of the next complete filename entry in the filename cache 160. To reduce problems that might otherwise be associated with this unused space, the unused space may be allocated to a dummy file name entry. To this end, the filesystem software checks at block 520 to determine whether a dummy entry is needed. If needed, the dummy entry is generated and stored after the current filename entry in the operation at block 525. If no dummy entry is needed, the put pointer 275 is updated to point to the end of the newly added filename entry in the operation at block 530. Alternatively, if a dummy entry is used at block 525, the put pointer 275 is updated to point to the end of the newly generated dummy entry. In the operation at block 535, the hash table 155 is updated to reflect changes to the filename cache buffer.

In a "filename not on system" update, the filesystem software 140 is directed to store a filename entry for a corresponding filename in the filename cache 160 and indicate that it is not on the system. To this end, the filename provided at block 505 is used to generate a filename header and name section for the absent filename in the operation shown at block 540. The missing field 330 of the generated filename header will be set to indicate that the filename is not on the system. This allows the filesystem software 140 to forgo searching the filesystem for a filename that has already been searched and not found on the system. Once the operation at block 540 is complete, the filesystem software 140 may proceed to execute the operations shown in blocks 515 through 535.

In a "filename deleted" update, the filesystem software 140 is directed to remove a filename entry for a corresponding filename from the filename cache 160. As shown, this is accomplished at block 545. In the operations at block 545, one or more bits in the filename header section of the filename entry that is to be removed are changed to indicate removal of the filename. For example, the unique file identifier field 310 may be filled with zeros or another value that is not associated with an actual file and known to be indicative of a removed file. Once the corresponding filename header section has been changed, the hash table is updated in the operations at block 535 to reflect changes to the filename cache 160.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

We claim:

1. A system comprising:
a processor;
a data storage device accessible by the processor; and
a filesystem software executable by the processor to organize a plurality of files on the data storage device, where the filesystem software is executable to maintain a filename cache comprising a plurality of entries, where each entry of the plurality of entries comprises a filename header section and a name section, where the name section stores an entire filename of a corresponding file,
where the filesystem software is further executable to identify a given entire filename to be stored in the name section of one of the plurality of entries, determine a number of bytes to allocate to the name section of the one of the plurality of entries based on the given entire filename to be stored and to allocate the determined number of bytes to the given name section of the one of the plurality of entries, thereby creating a variable size filename entry,
where the filesystem software is further executable to characterize each of the plurality of entries based on a namesum value of each of the plurality of entries where the namesum value of each of the plurality of entries is calculated based on the entire filename stored in the name section of each of the plurality of entries,
where the filesystem software is further executable to generate an index into a hash table from the namesum value of at least one of the plurality of entries, and
where data in the hash table at the index directs the file system software to the at least one of the plurality of entries having a same namesum value.

2. The system of claim 1, where the filename header section of each of the plurality of entries comprises an index to a next entry of the plurality of entries characterized by a same namesum value.

3. The system of claim 2, where the filesystem software is further executable to receive a request for a file, calculate a namesum value of the requested file based on a filename of the requested file, identify a first entry of the plurality of entries characterized by the namesum value of the requested file, determine whether the first entry of the plurality of entries corresponds to the requested file, and access a second entry of the plurality of entries characterized by the namesum value of the requested file, based on the index stored in the name section of the first entry of the plurality of entries if the first entry of the plurality of entries does not correspond to the requested file.

4. The system of claim 1, where the filename header section comprises an information item uniquely identifying a file associated with the filename in the name section.

5. The system of claim 1, where the filename header section of at least one entry of the plurality of entries further comprises an information item indicative of whether the at least one entry corresponds to a first entry in the hash table for a particular namesum value.

6. The system of claim 1, where the filename header section of each entry of the plurality of entries comprises an information item indicative of whether the filename in the name section of each entry of the plurality of entries is not locatable on the system.

7. A method for operating a filesystem comprising:
   allocating a storage space to a filename cache;
   organizing the filename cache into a plurality of variable size filename entries, where each variable size filename entry of the plurality of variable size filename entries comprises a filename header section and a name section, where the name section stores a filename of a corresponding file;
   identifying a given filename to be stored in the name section of one of the plurality of variable size filename entries;
   determining a number of bytes to allocate to the name section of the one of the plurality of variable size filename entries based on the given filename to be stored;
   allocating the determined number of bytes to the given name section of the one of the plurality of variable size filename entries; and
   characterizing each of the plurality of variable size filename entries based on a namesum value of each of the plurality of variable size filename entries,
   where the namesum value of each of the plurality of variable size filename entries is calculated based on the filename stored in the name section of each of the plurality of variable size filename entries,
   where an index into a hash table is generated from the namesum value of at least one of the plurality of variable size filename entries, and
   where data in the hash table at the index includes a pointer to the at least one of the plurality of variable size filename entries having a same namesum value.

8. The method of claim 7, where the storage space allocated for the filename cache comprises a ring-type buffer.

9. The method of claim 8, further comprising adding a plurality of dummy filename entries to compensate for wrap-around writing of the plurality of variable size filename entries to the ring-type buffer.

10. The method of claim 7, further comprising calculating a namesum using a requested filename of a requested file.

11. The method of claim 10, further comprising generating an index from the calculated namesum.

12. The method of claim 11, further comprising:
   using the index from the calculated namesum to obtain an initial pointer from the hash table; and
   using the initial pointer to access a first variable size filename entry of the plurality of variable size filename entries in the filename cache having the calculated namesum.

13. The method of claim 12, further comprising comparing the requested filename to the filename stored in the name section of the first variable size filename entry for a match.

14. The method of claim 13, where the filename header section of the first variable size filename entry comprises an information item corresponding to a parent directory of the corresponding file.

15. The method of claim 14, further comprising comparing a parent directory information item of the requested file to the information item of the filename header section of the first variable size filename entry to determine whether there is a match between the requested file and the file corresponding to the first variable size filename entry.

16. A storage medium comprising code adapted to execute a method for operating a filesystem comprising:
   allocating a storage space to a filename cache;
   organizing the filename cache into a plurality of variable size filename entries, where each variable size filename entry of the plurality of variable size filename entries comprises a filename header section and a name section, where the name section stores a filename of a corresponding file; and
   characterizing each of the plurality of variable size filename entries based on a namesum value of each of the plurality of variable size filename entries,
   where the namesum value of each of the plurality of variable size filename entries is calculated based on the filename stored in the name section of each of the plurality of variable size filename entries,
   where an index into a hash table is generated from the namesum value of at least one of the plurality of variable size filename entries, and
   where data in the hash table at the index includes a pointer to the at least one of the plurality of variable size filename entries having a same namesum value.

17. The storage medium of claim 16, where the storage space allocated for the filename cache by the method comprises a ring-type buffer.

18. The storage medium of claim 17, where the method further comprises adding a plurality of dummy filename entries to compensate for wrap-around writing of the plurality of variable size filename entries to the ring-type buffer.

19. The storage medium of claim 16, where the method further comprises calculating a namesum using a requested filename of a requested file.

20. The storage medium of claim 19, where the method further comprises:
   using the namesum calculated from the requested file as an index into the hash table to obtain the pointer from the hash table; and
   using the pointer to access a first variable size filename entry in the filename cache having the calculated namesum.

* * * * *